(No Model.) 2 Sheets—Sheet 1.

J. BRAUN.
COOLER FOR BEER.

No. 417,467. Patented Dec. 17, 1889.

WITNESSES:
P. H. Eagles.
L. Douville.

INVENTOR:
John Braun
BY John A. Wiedersheim
ATTORNEY

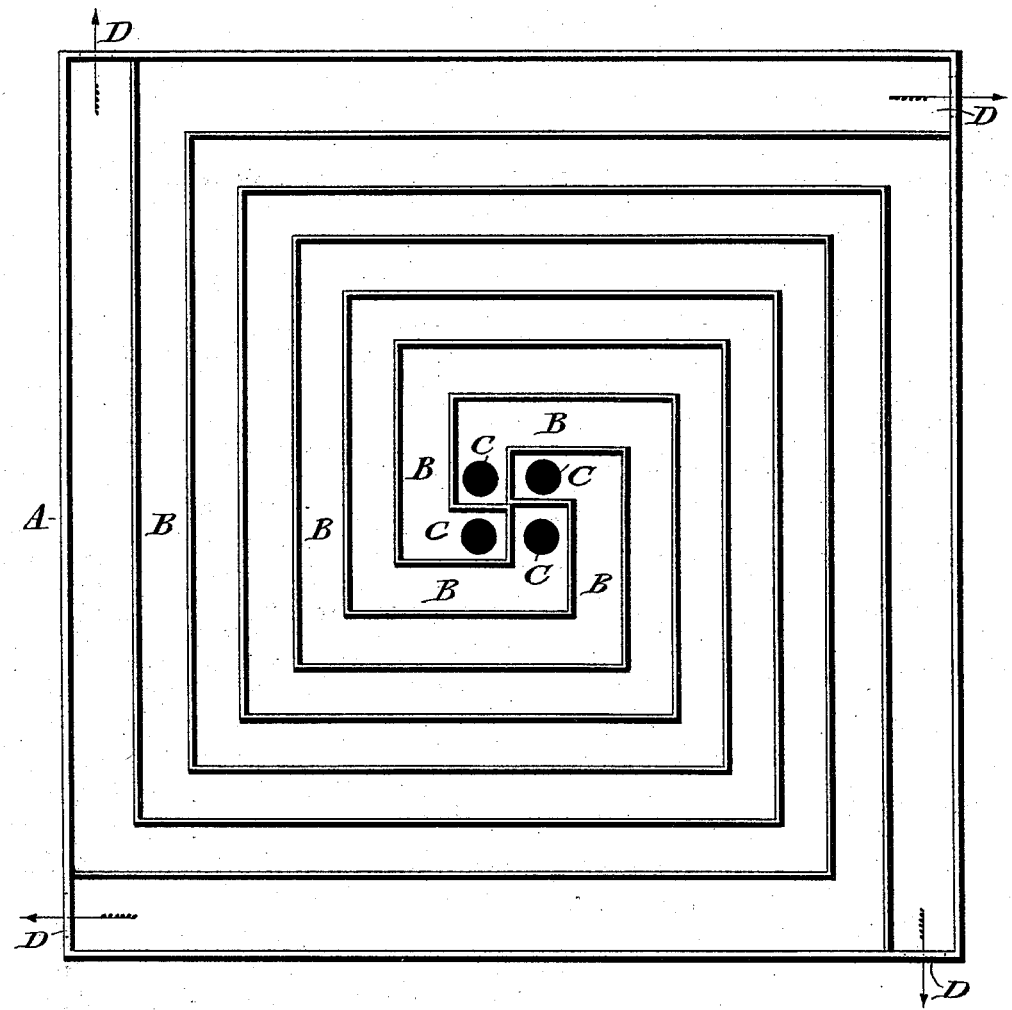

UNITED STATES PATENT OFFICE.

JOHN BRAUN, OF CAMDEN, NEW JERSEY.

COOLER FOR BEER.

SPECIFICATION forming part of Letters Patent No. 417,467, dated December 17, 1889.

Application filed June 11, 1889. Serial No. 313,825. (No model.)

*To all whom it may concern:*

Be it known that I, JOHN BRAUN, a citizen of the United States, residing in the city and county of Camden, State of New Jersey, have invented a new and useful Improvement in Coolers for Beer, &c., which improvement is fully set forth in the following specification and accompanying drawings.

My invention relates to coolers for beer, &c.; and it consists of an outer casing and an inner partition formed of a single continuous wall, as shown, whereby two separate channels are constructed within said casing, each of said channels or passages having a separate inlet and a separate outlet.

The invention also consists of the combination of parts herein set forth and claimed.

Figure 1:
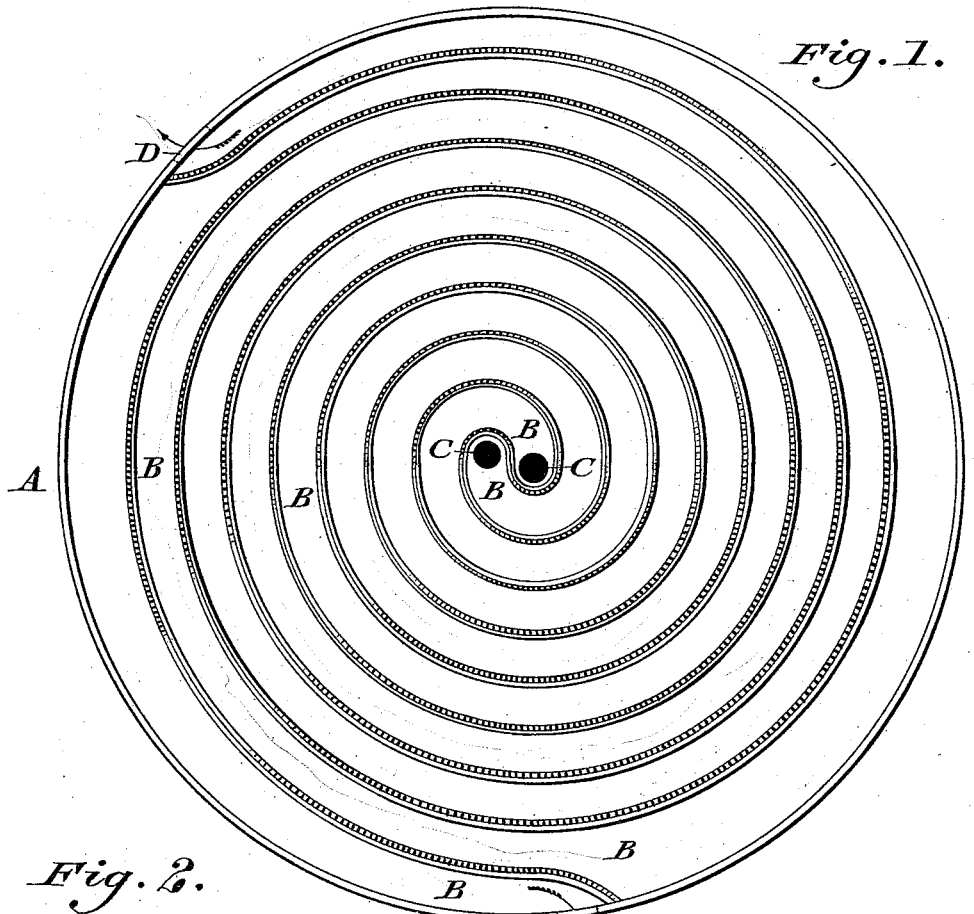
Figure 2:
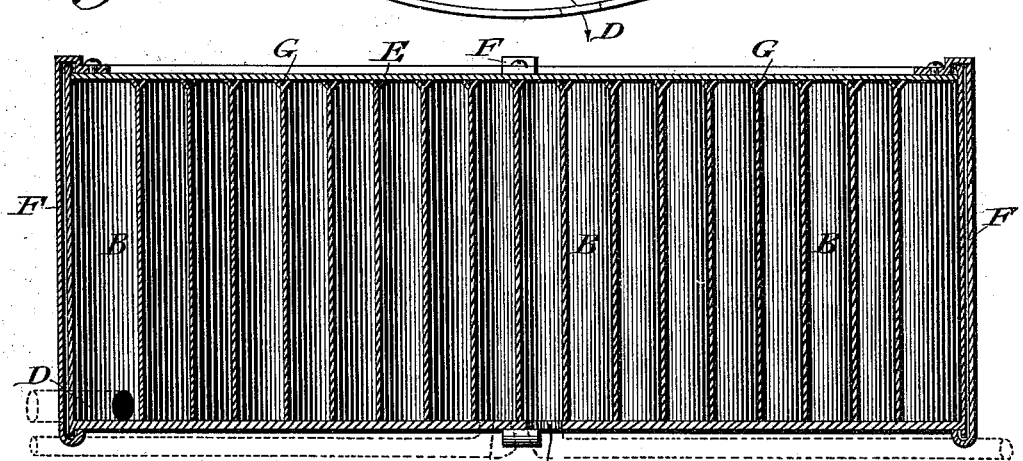

Figures 1 and 3 represent a top or plan view of the interior of coolers embodying my invention. Fig. 2 represents a vertical section of the cooler shown in Fig. 1.

Similar letters of reference indicate corresponding parts in the several figures.

Referring to the drawings, A designates the body of the cooler, consisting of a pan or vessel of cylindrical, quadrilateral, or other shape, and within the same are channels B, formed by walls which are tightly closed at top and bottom, so as to separate the channels. In Fig. 1 the walls and channels are spiral or scroll-shaped, and in Fig. 3 they are rectangular. In Fig. 1 there are two channels, and in Fig. 3 there are four channels, each channel having an inlet C and an outlet D. It will be seen that fluid may enter any of the inlets C, the same flowing around the channel and being discharged at the outlet D. One of the channels may receive ice-water or other cooling medium and thus cool the fluid in the other channel, or different fluid admitted into the channels, and the cooler covered with ice or submerged in a refrigerating-mixture, this feature being preferable in some cases for domestic and saloon purposes. The top E is held tightly in position by doubly-hooked rods or bars F, whose ends engage with the top and bottom of the pan, the lower hooks engaging a downward-projecting flange or rim on the bottom of the casing and the upper hooks being screwed to the top of the pan, whereby they are firmly connected with said top and the latter held tightly in position. As the lid is removable, the upper ends of the walls, which form the channels B, are provided with gutters G, the same receiving packing against which the lid is pressed, thus producing tight joints between the lid and walls. Gutters may also be provided at the lower ends of the walls in cases where the bottom of the pan is removable.

Having thus described my invention, what I claim as new, and desire to secure by Letters Patent, is—

A beer-cooler consisting of a vessel with a continuous wall therein, forming separate channels with inlet and outlet ports, a gutter in the upper end of said wall, packing in said gutter, and a detachable lid resting on said gutter and the side of the vessel, said parts being combined substantially as described.

JOHN BRAUN.

Witnesses:
JOHN A. WIEDERSHEIM,
WM. C. WIEDERSHEIM.